US012649531B2

(12) United States Patent　　(10) Patent No.:　US 12,649,531 B2
Robinson　　(45) Date of Patent:　Jun. 9, 2026

(54) TIRE HOIST APPARATUS

(71) Applicant: Michael Robinson, Grand Junction, CO (US)

(72) Inventor: Michael Robinson, Grand Junction, CO (US)

(*) Notice: Subject to any disclaimer, the term of this patent is extended or adjusted under 35 U.S.C. 154(b) by 107 days.

(21) Appl. No.: 18/428,977

(22) Filed: Jan. 31, 2024

(65) Prior Publication Data

US 2025/0242872 A1　　Jul. 31, 2025

(51) Int. Cl.
B62D 43/02　　(2006.01)
B62D 43/00　　(2006.01)

(52) U.S. Cl.
CPC ........... B62D 43/02 (2013.01); B62D 43/002 (2013.01)

(58) Field of Classification Search
CPC .............................. B62D 43/02; B62D 43/002
See application file for complete search history.

(56) References Cited

U.S. PATENT DOCUMENTS

| | | | |
|---|---|---|---|
| 4,278,191 A * | 7/1981 | Mecham | B62D 43/002 |
| | | | 414/466 |
| 4,312,620 A * | 1/1982 | Muschalek, Jr. | B62D 43/04 |
| | | | 414/466 |
| 5,104,015 A * | 4/1992 | Johnson | B60R 9/06 |
| | | | 224/42.21 |
| 5,791,858 A * | 8/1998 | Sasser | A22B 5/06 |
| | | | 452/187 |

| | | | |
|---|---|---|---|
| 6,386,817 B1 * | 5/2002 | Cash | B60R 9/06 |
| | | | 414/720 |
| 6,631,834 B2 | 10/2003 | Slovick | |
| 6,659,318 B2 | 12/2003 | Newbill | |
| 7,594,641 B2 * | 9/2009 | Sharp | B66C 23/36 |
| | | | 254/325 |
| 7,845,622 B1 | 12/2010 | Riggs | |
| 7,931,524 B2 * | 4/2011 | McKenzie | B60P 1/5471 |
| | | | 452/187 |
| 8,540,125 B2 * | 9/2013 | Newbill | B62D 43/02 |
| | | | 224/42.28 |
| D758,254 S | 6/2016 | Woller, Jr. | |
| 10,179,615 B2 | 1/2019 | Neuwirt | |
| 10,329,128 B2 | 6/2019 | Clarke | |
| 10,479,284 B1 * | 11/2019 | Salyer | B60R 9/06 |
| 10,807,658 B1 | 10/2020 | Cho | |
| 11,021,349 B2 * | 6/2021 | Wilson | B66C 23/44 |
| 11,820,292 B2 * | 11/2023 | Ruff | B60R 11/00 |
| 2003/0024958 A1 * | 2/2003 | Slovick | B62D 43/002 |
| | | | 224/512 |
| 2004/0222261 A1 * | 11/2004 | Wilson | B62D 43/002 |
| | | | 224/42.21 |

(Continued)

FOREIGN PATENT DOCUMENTS

CA　　2358338　　10/2002

*Primary Examiner* — Brian D Nash

(57)　　ABSTRACT

A tire hoist apparatus for lifting and lowering spare tires at a rear of a vehicle includes a hitch mount which is shaped and configured to attach to a hitch receiver tube of the vehicle. A frame is coupled to the hitch mount and is shaped and configured to accommodate a spare tire positioned vertically above the hitch receiver tube. A cable is mounted to the frame and is movable with respect to the frame to alternately lift and lower a free end of the cable with respect to the frame. An upper portion of the frame is pivotable on a lower portion of the frame.

8 Claims, 5 Drawing Sheets

(56)  References Cited

U.S. PATENT DOCUMENTS

| | | | |
|---|---|---|---|
| 2005/0184111 A1* | 8/2005 | Newbill | B60D 1/065 |
| | | | 224/42.21 |
| 2006/0045704 A1* | 3/2006 | Laufenberg | B60P 1/548 |
| | | | 414/543 |
| 2007/0075511 A1* | 4/2007 | Shubert | B62D 43/002 |
| | | | 280/79.4 |
| 2009/0242600 A1* | 10/2009 | Helms | B60R 19/48 |
| | | | 224/489 |
| 2017/0267295 A1* | 9/2017 | Neuwirt | B62D 43/002 |

* cited by examiner

TIRE HOIST APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to hoists and more particularly pertains to a new hoist for lifting and lowering spare tires at a rear of a vehicle.

(2) Description of Related Art Including Information Disclosed Under 37 CFR 1.97 and 1.98

Spare tires are frequently stored by mounting them to the rear of a vehicle. Such tires may be difficult to remove and especially to mount onto the vehicle due to the weight and size of the tires. To facilitate attachment and removal of such tires, the prior art discloses various hoists which attach to a vehicle and which may be used to lift and lower spare tires near the rear of the vehicle. U.S. Pat. No. 7,845,622 and U.S. Pat. App. Pub. No. 2006/0045704, for example, disclose cable hoists which attach to a hitch receiver tube of a vehicle. U.S. Pat. No. 10,179,615 discloses a winch and cable system which is mountable to the rear of a vehicle to lift and lower spare tires from a mounting bracket on the vehicle. Finally, U.S. Pat. No. 10,807,658 discloses a mechanism for lifting and lowering spare tires near the rear end of vehicles which mounts to the hitch receiver tube of such vehicles. However, the prior art fails to describe a cable hoist for lifting and lowering spare tires near the rear of a vehicle via attachment to the vehicle's receiver tube.

BRIEF SUMMARY OF THE INVENTION

An embodiment of the disclosure meets the needs presented above by generally comprising a hitch mount which is shaped and configured to attach to a hitch receiver tube of a vehicle. A frame is coupled to the hitch mount and is shaped and configured to accommodate a spare tire positioned vertically above the hitch receiver tube. A cable is mounted to the frame and is movable with respect to the frame to alternately lift and lower a free end of the cable with respect to the frame.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
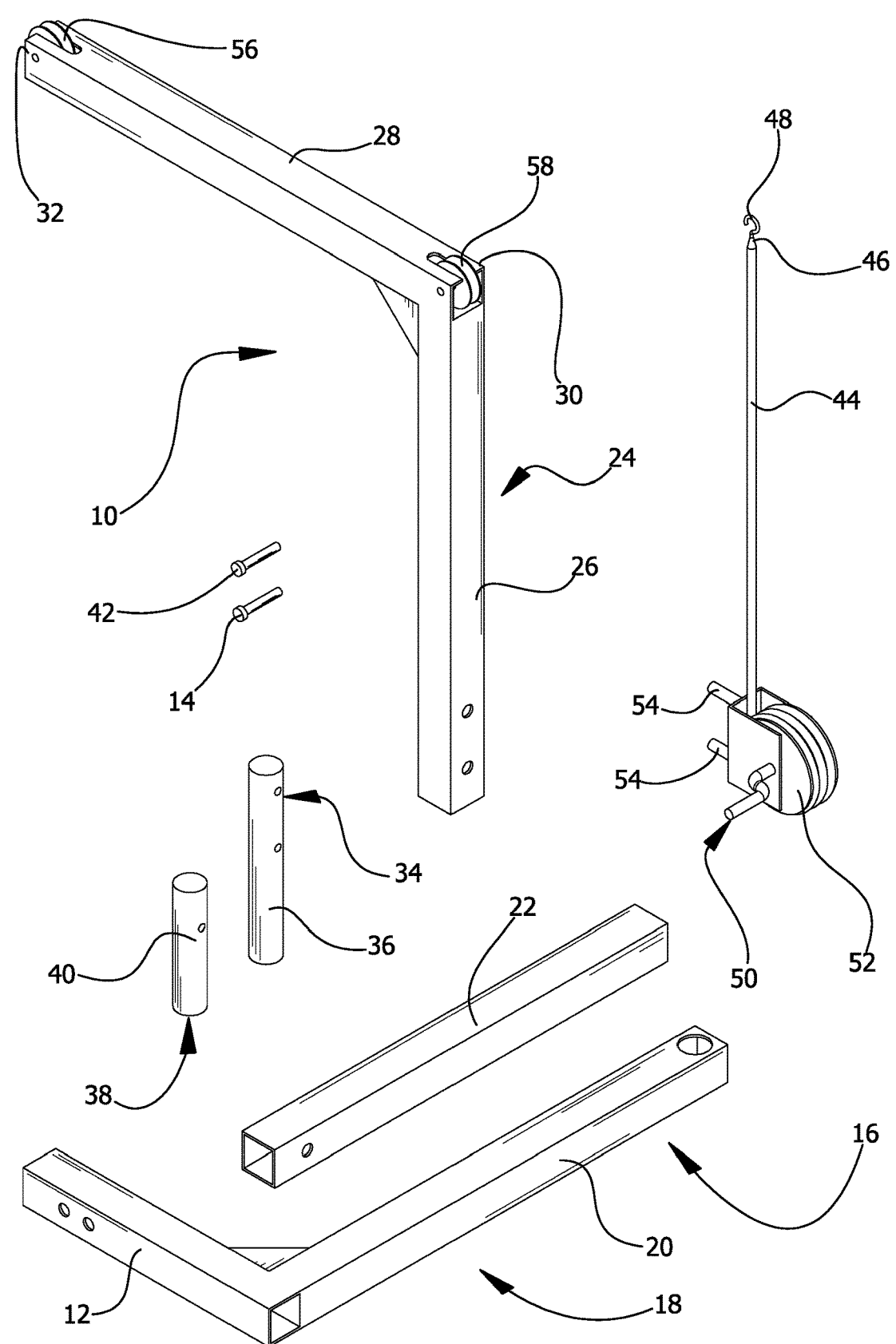
FIG. 1 is a perspective kit view of a tire hoist apparatus according to an embodiment of the disclosure.
Figure 2:
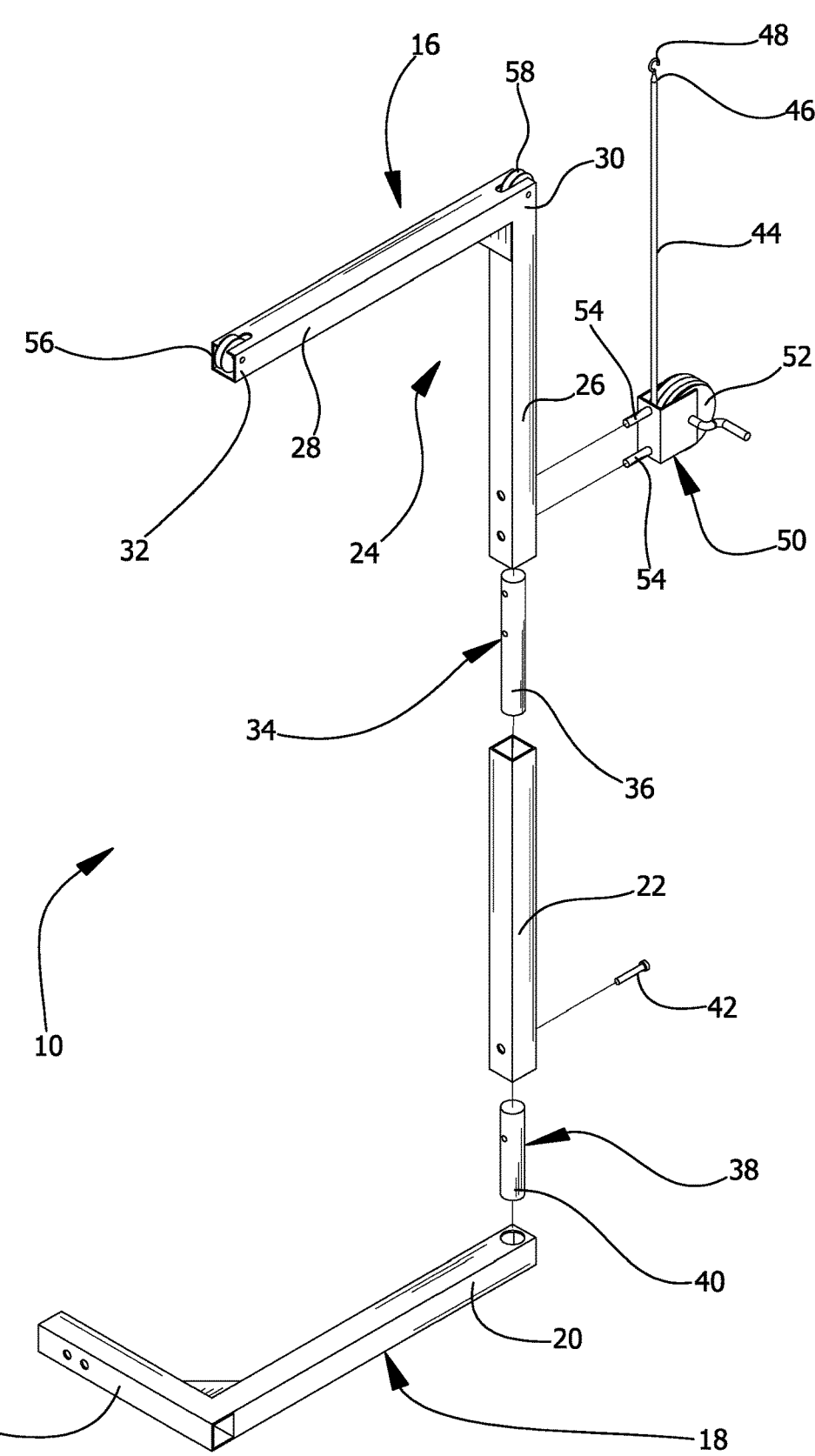
FIG. 2 is an exploded perspective view of an embodiment of the disclosure.
Figure 3:
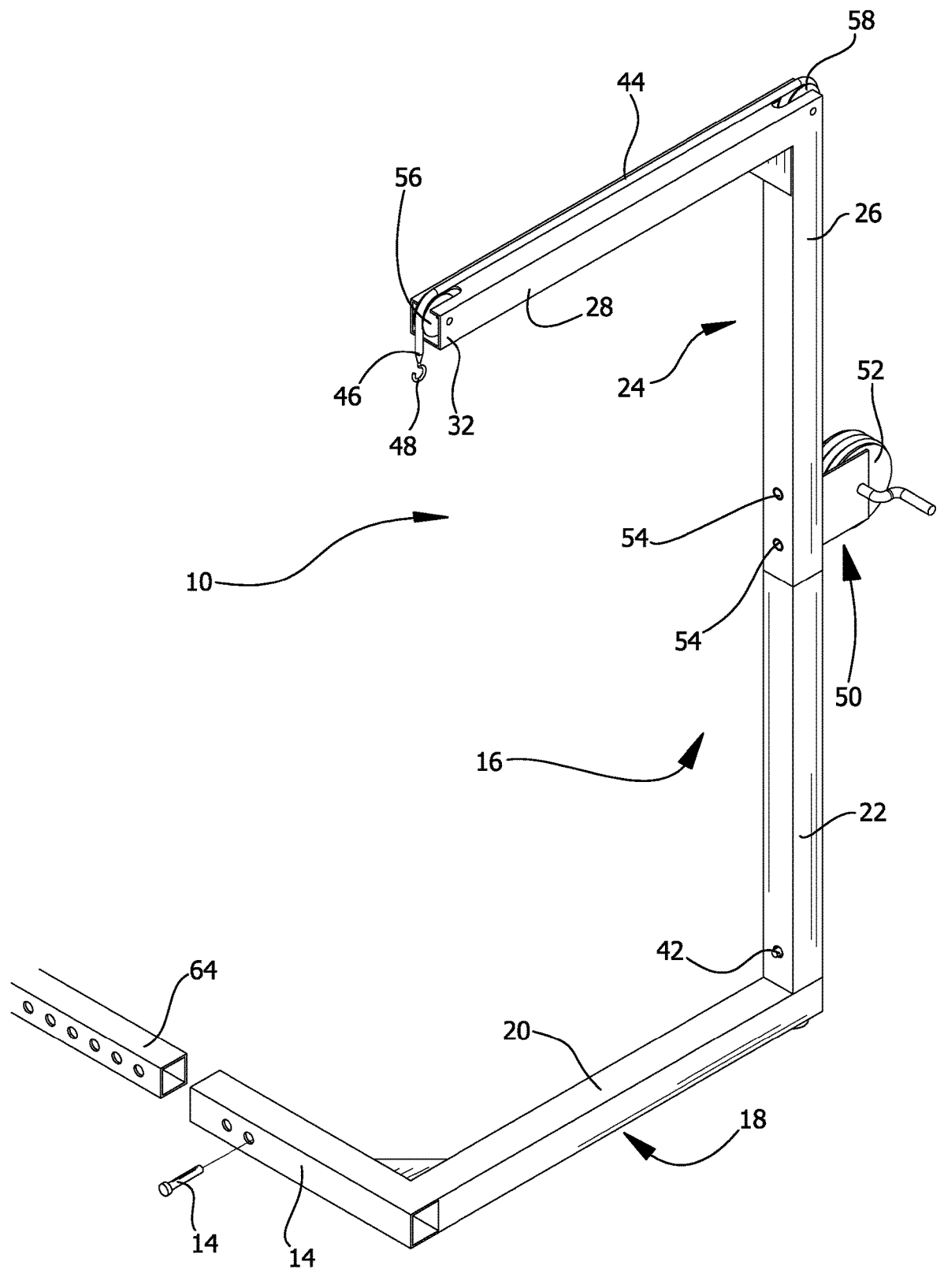
FIG. 3 is a perspective view of an embodiment of the disclosure.
Figure 4:
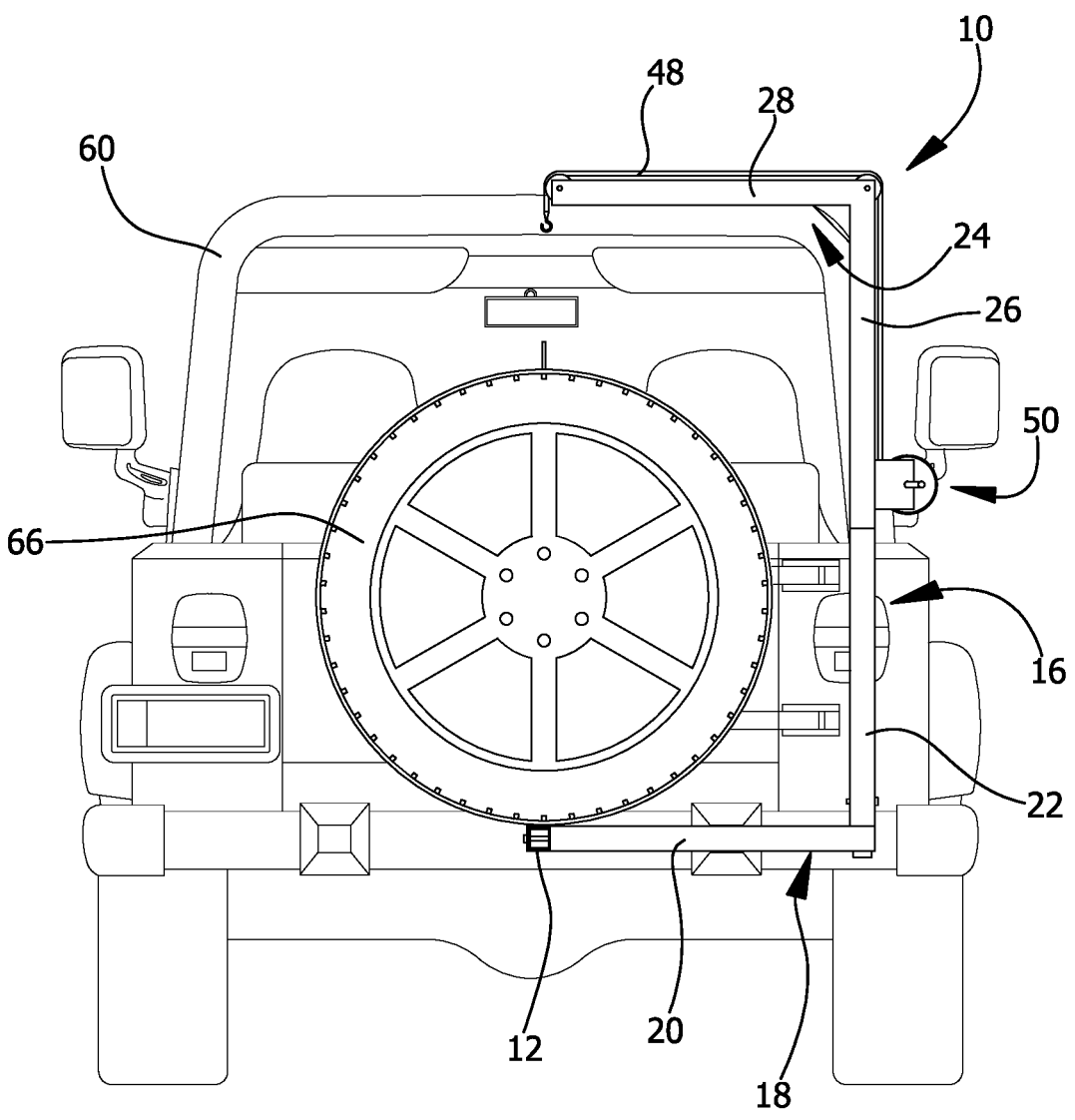
FIG. 4 is an in-use view of an embodiment of the disclosure.
Figure 5:
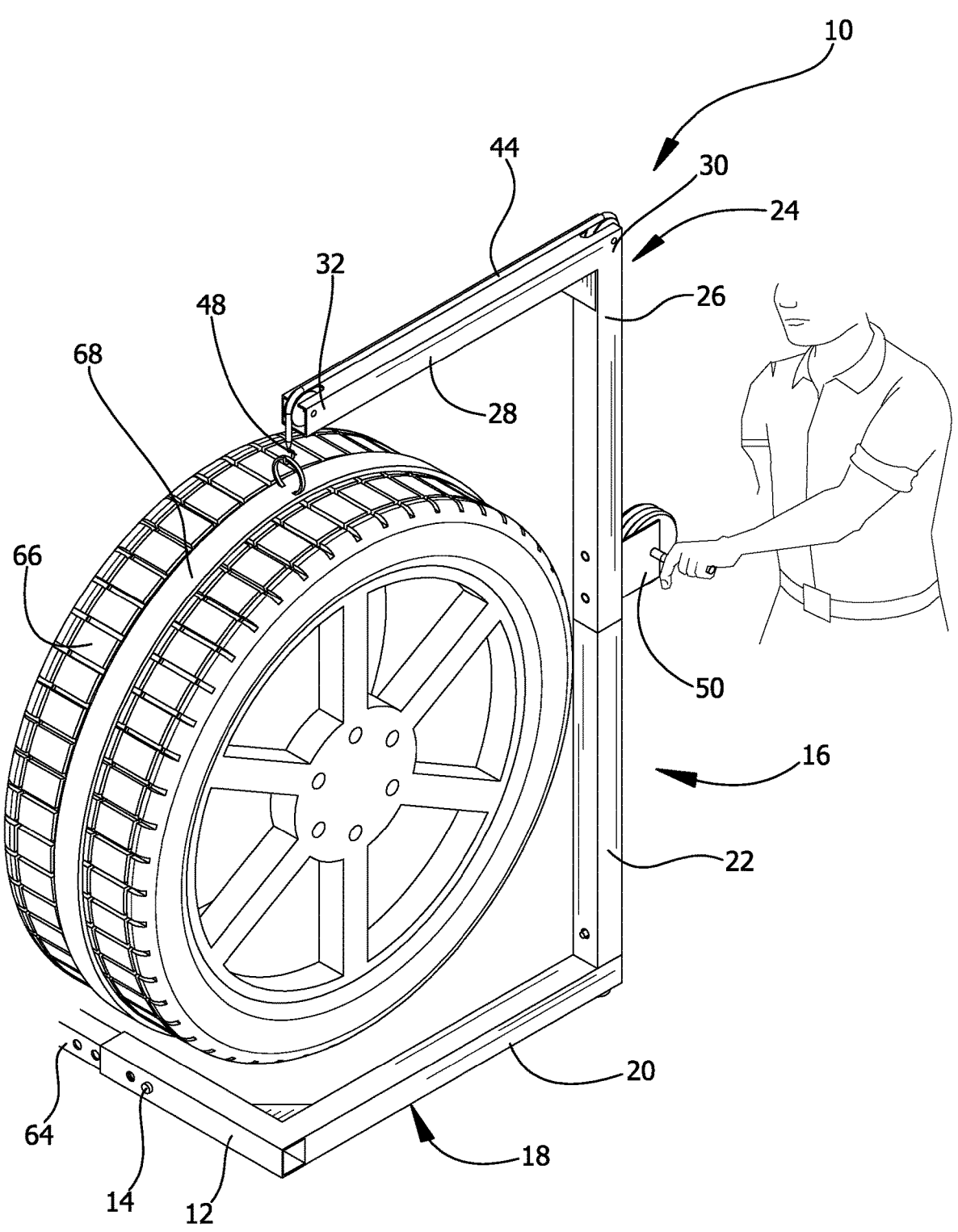
FIG. 5 is an in-use view of an embodiment of the disclosure.

With reference now to the drawings, and in particular to FIGS. 1 through 5 thereof, a new hoist embodying the principles and concepts of an embodiment of the disclosure and generally designated by the reference numeral 10 will be described.

As best illustrated in FIGS. 1 through 5, the tire hoist apparatus 10 generally comprises a hitch mount 12 which is shaped and configured to attach to a hitch receiver tube 64 of a vehicle 60. The hitch mount 12 is elongated and receives the hitch receiver tube 64 therein. The hitch mount 12 is secured to the hitch receiver tube 64 via a lock pin 14 or other suitable fastener. In other embodiments, the hitch mount 12 may insert into the hitch receiver tube 64.

A frame 16 is coupled to the hitch mount 12 and is shaped and configured to accommodate a spare tire 66 positioned vertically above the hitch receiver tube 64. The frame 16 comprises an upper portion 24 and a lower portion 18 which collectively form a C-shape. The lower portion 18 comprises a lower beam 20 and a lower post 22. The lower beam 20 is coupled to the hitch mount 12 and extends perpendicularly away from the hitch mount 12. The lower post 22 is coupled to the lower beam 20 distal from the hitch mount 12 and extends perpendicularly away from the lower beam 20. The upper portion 24 comprises an upper post 26 and an upper beam 28. The upper post 26 is pivotably coupled to the lower post 22 opposite the lower beam 20. The upper beam 28 is coupled to the upper post 26 distal from the lower post 22 and extends perpendicularly away from the upper post 26. In some embodiments, the upper beam 28 may be foldable toward the upper post 26 via a hinge or the like for more compact storage of the frame 16. A latch or other suitable fastener may retain the upper beam 28 in an extended configuration during use in such embodiments.

A post-to-post fastener 34 removably couples the upper post 26 of the upper portion 24 to the lower post 22 of the lower portion 18, The post-to-post fastener 34 comprises a post rod 36 which is fixedly coupled to the upper post 26 and is slidably received into the lower post 22. The post rod 36 is also rotatable within the lower post 22, which facilitates rotation of the upper portion 24 with respect to the lower portion 18. Other fasteners suitable for removably coupling the upper portion 24 to the lower portion 18 and facilitating rotation of the upper portion 24 with respect to the lower portion 18 may be used. In some embodiments, the upper portion 24 is not removable from the second portion.

A post-to-beam fastener 38 removably couples the lower post 22 to the lower beam 20. The post-to-beam fastener 38 comprises a beam rod 40 which is fixedly coupled to the lower post 22 and is slidably received into the lower beam 20. The post-to-beam fastener 38 may also be rotatable within the lower beam 20, which would facilitate rotation of the lower post 22 with respect to the lower beam 20. A retaining pin 42 may be used to secure the post-to-beam fastener 38 to the lower post 22.

A cable 44 is mounted to the frame 16 and is movable with respect to the frame 16 to alternately lift and lower a free end 46 of the cable 44 with respect to the frame 16. A hook 48 or other fastener may be mounted to the free end 46 of the cable 44 to facilitate securing the spare tire 66 to the cable 44 at the free end 46. A strap 68 may also be used in conjunction with the hook 48 which may be placed around the spare tire 66 to secure the spare tire 66 to the cable 44. A winch 50 mounted to the upper post 26 of the upper portion 24 of the frame 16. The cable 44 engages the winch 50 such that the winch 50 is operable to alternately wind and unwind the cable 44 from a drum 52 of the winch 50. The winch 50 comprises a handle for manually winding and unwinding the cable 44, but the winch 50 may be powered by a motor or other suitable drive mechanism in other embodiments. Protrusions 54 coupled to the winch 50 are insertable through the upper post 26 and the post-to-post pin to secure the winch 50 and the post-to-post pin to the upper post 26. Weldments, threaded fasteners, or the like may also be used in other embodiments to attach the winch 50 and the post-to-post pin to the upper post 26.

A first pulley 56 and a second pulley 58 are rotatably mounted to the frame 16, and the cable 44 engages each of the first pulley 56 and the second pulley 58. The first pulley 56 is positioned at a distal end 32 of the upper beam 28 with respect to the upper post 26, and the second pulley 58 is positioned at a proximal end 30 of the upper beam 28 with respect to the upper post 26.

In use, the frame 16 is mounted to the hitch receiver tube 64 via the hitch mount 12. The spare tire 66 is mounted to the free end 46 of the cable 44, and the cable 44 is operated via the winch 50 or other suitable means to lift or lower the spare tire 66 as desired. The upper portion 24 of the frame 16 is pivoted toward or away from the vehicle 60 as desired to avoid obstruction to the spare tire 66 or move the spare tire 66 toward a mounting bracket on the vehicle 60.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tire hoist apparatus comprising:
   a hitch mount shaped and configured to attach to a hitch receiver tube of a vehicle;
   a frame coupled to the hitch mount, the frame being shaped and configured to accommodate a spare tire positioned vertically above the hitch receiver tube;
   a cable mounted to the frame, the cable being movable with respect to the frame to alternately lift and lower a free end of the cable with respect to the frame;
   wherein the frame comprises a lower portion and an upper portion, the lower and upper portions being coupled to each other and forming a C-shape, the cable being slidably mounted at an upper end of the C-shape and being positioned over the hitch mount;
   wherein the hitch mount is elongated;
   wherein the lower portion comprises a lower beam and a lower post, the lower beam being coupled to the hitch mount, the lower beam extending perpendicularly away from the hitch mount, the lower post being coupled to the lower beam distal from the hitch mount, the lower post extending perpendicularly away from the lower beam; and
   wherein the upper portion comprises an upper post and an upper beam, the upper post being pivotably coupled to the lower post opposite the lower beam, the upper beam being coupled to the upper post distal from the lower post, the upper beam extending perpendicularly away from the upper post.

2. The apparatus of claim 1, wherein the lower post is removable from the lower beam.

3. The apparatus of claim 1, wherein the upper post is removable from the lower post.

4. The apparatus of claim 1, further comprising a post-to-post fastener removably coupling the upper post of the upper portion to the lower post of the lower portion, the post-to-post fastener comprising a post rod, the post rod being coupled to the upper post and being slidably received into the lower post, the post rod facilitating rotation of the upper portion with respect to the lower portion.

5. The apparatus of claim 1, further comprising a post-to-beam fastener removably coupling the lower post to the lower beam, the post-to-beam fastener comprising a beam rod, the beam rod being coupled to the lower post and being slidably received into the lower beam.

6. The apparatus of claim 1, further comprising a first pulley mounted to the frame, the cable engaging the first pulley, the first pulley being positioned at a distal end of the upper beam with respect to the upper post.

7. The apparatus of claim 6, further comprising a second pulley mounted to the frame, the cable engaging the second pulley, the second pulley being positioned at a proximal end of the upper beam with respect to the upper post.

8. A tire hoist apparatus comprising:

a hitch mount shaped and configured to attach to a hitch receiver tube of a vehicle, the hitch mount being elongated;

a frame coupled to the hitch mount, the frame being shaped and configured to accommodate a spare tire positioned vertically above the hitch receiver tube, the frame comprising:

a lower portion comprising a lower beam and a lower post, the lower beam being coupled to the hitch mount, the lower beam extending perpendicularly away from the hitch mount, the lower post being coupled to the lower beam distal from the hitch mount, the lower post extending perpendicularly away from the lower beam, the lower post being removable from the lower beam;

an upper portion coupled to and extending upwardly from the lower portion, the upper portion being pivotable with respect to the lower portion, the upper portion comprising an upper post and an upper beam, the upper post being pivotably coupled to the lower post opposite the lower beam, the upper beam being coupled to the upper post distal from the lower post, the upper beam extending perpendicularly away from the upper post, the upper post being removable from the lower post;

a post-to-post fastener removably coupling the upper post of the upper portion to the lower post of the lower portion, the post-to-post fastener comprising a post rod, the post rod being coupled to the upper post and being slidably received into the lower post, the post rod facilitating rotation of the upper portion with respect to the lower portion; and a post-to-beam fastener removably coupling the lower post to the lower beam, the post-to-beam fastener comprising a beam rod, the beam rod being coupled to the lower post and being slidably received into the lower beam;

a cable mounted to the frame, the cable being movable with respect to the frame to alternately lift and lower a free end of the cable with respect to the frame;

a winch mounted to the frame, the winch being coupled to the cable and being operable to alternately wind and unwind the cable from a drum of the winch, the winch being positioned on the upper post of the upper portion of the frame; and a first pulley and a second pulley rotatably mounted to the frame, the cable engaging each of the first pulley and the second pulley, the first pulley being positioned at a distal end of the upper beam with respect to the upper post, the second pulley being positioned at a proximal end of the upper beam with respect to the upper post.

* * * * *